United States Patent [19]

Kawaguchi et al.

[11] Patent Number: 5,718,455
[45] Date of Patent: Feb. 17, 1998

[54] ENERGY ABSORBING SEAT BELT WEBBING

[75] Inventors: Teruhiko Kawaguchi; Kazuyuki Hashimoto; Toshio Nagata; Seiji Yokota; Yasumichi Takei, all of Aichi-ken, Japan

[73] Assignees: Kabushiki Kaisha Tokai-Rika-Denki-Seisakusho; Toyota Shatai Kabushiki Kaisha, both of Aichi-ken, Japan

[21] Appl. No.: 637,161

[22] Filed: Apr. 24, 1996

[30] Foreign Application Priority Data

May 11, 1995 [JP] Japan ................ 7-113101

[51] Int. Cl.⁶ ................................ B60R 22/28
[52] U.S. Cl. ............. 280/805; 297/470; 188/376
[58] Field of Search ............... 280/805, 801.1, 280/808; 297/472, 471, 470; 188/376, 371

[56] References Cited

U.S. PATENT DOCUMENTS

| | | | |
|---|---|---|---|
| 4,588,208 | 5/1986 | Yoshitsugu | 280/805 |
| 5,529,343 | 6/1996 | Klink | 280/805 |
| 5,547,223 | 8/1996 | Koketsu et al. | 280/805 |

FOREIGN PATENT DOCUMENTS

| | | | |
|---|---|---|---|
| 0128662 | 12/1984 | European Pat. Off. | |
| 24 26 203 | 12/1975 | Germany | 280/805 |

OTHER PUBLICATIONS

Office Action in corresponding Australian patent App. No. 52046/96 (copies of cited refernece listed above).

*Primary Examiner*—Peter C. English
*Attorney, Agent, or Firm*—Sixbey Friedman Leedom & Ferguson; Thomas W. Cole

[57] ABSTRACT

A vehicle occupant-restraining webbing is used in a seat belt apparatus of a vehicle in which an air bag apparatus is provided as an auxiliary occupant protecting apparatus, and comprises a webbing length increasing section in which a folded portion of the webbing, formed with a portion of the webbing being folded in a longitudinal direction of the webbing, includes first, second and third regions arranged in order from a fold base end to a fold tip end, wherein the first region is formed by stitching and when a first tensile force acts in the longitudinal direction of the webbing and is applied to the first region to undo the stitching of the first region, the length of the webbing is increased, the second region is provided so as to increase the length of the webbing without applying active tensile force in the longitudinal direction of the webbing when the stitching of the second region comes undone, and the third region is formed by stitching and when a second tensile force which is smaller than the first tensile force acts in the longitudinal direction of the webbing and is applied to the third region to undo the stitching of the third region, the length of the webbing is increased.

21 Claims, 3 Drawing Sheets

ENERGY ABSORBING SEAT BELT WEBBING

BACKGROUND OF THE INVENTION

1. Field of the Invention

The present invention relates to a vehicle occupant-restraining webbing which is used in a seat belt apparatus of a vehicle to restrain a vehicle occupant.

2. Description of the Related Art

Generally, in a three-point seat belt apparatus of a vehicle, when a webbing pulled out of a webbing winding apparatus is passed through a shoulder anchor and a tongue plate which is fitted to a longitudinally intermediate portion of the webbing so as to be slidable in the longitudinal direction of the webbing is engaged with a buckle provided at a side of a vehicle body, the webbing is applied to the vehicle occupant by a lap webbing portion which abuts against a lap region of the occupant's body and a shoulder webbing portion which abuts against parts of the occupant's body ranged from the chest to the shoulder.

In a normal state, the webbing can be pulled out of the webbing winding apparatus. However, at the time of a sudden deceleration of the vehicle, the webbing is prevented from being pulled out of the webbing winding apparatus and the vehicle occupant is restrained from moving inertially in a forward direction of the vehicle and is accordingly protected.

On the other hand, an air bag apparatus is used as an auxiliary occupant protecting apparatus of a vehicle. For example, an air bag apparatus for a driver's seat is provided on a steering wheel, and when the state of a sudden deceleration of the vehicle is detected by an acceleration sensor, an inflator is actuated. As a result, high pressure gas is generated and is supplied into a bag body which in turn inflates toward a vehicle occupant to restrain the occupant.

It is preferable that a vehicle occupant-restraining operation by the webbing winding apparatus and the air bag apparatus is effected as gradually as possible.

SUMMARY OF THE INVENTION

In view of the above-described circumstances, it is an object of the present invention to provide a vehicle occupant-restraining webbing which realizes gradual restraining of a vehicle occupant.

The present invention is a vehicle occupant-restraining webbing which is used in a seat belt apparatus of a vehicle in which an air bag apparatus is provided as an auxiliary occupant protecting apparatus, comprising: a webbing length increasing section in which a folded portion of the webbing, formed with a portion of the webbing being folded in a longitudinal direction of the webbing, includes first, second and third regions arranged in order from a fold base end to a fold tip end, wherein the first region is formed by stitching and when a first tensile force acts in the longitudinal direction of the webbing and is applied to the first region to undo the stitching of the first region, the length of the webbing is increased; the second region is provided so as to increase the length of the webbing without applying active tensile force in the longitudinal direction of the webbing when the stitching of the second region comes undone; and the third region is formed by stitching and when a second tensile force which is smaller than the first tensile force acts in the longitudinal direction of the webbing and is applied to the third region to undo the stitching of the third region, the length of the webbing is increased.

According to the above-described structure, at the time of a sudden deceleration of a vehicle, the seat belt apparatus is actuated and the vehicle occupant is restrained by the webbing. Further, at the time of a sudden deceleration of the vehicle, the air bag apparatus is actuated and a bag body inflates to restrain the vehicle occupant.

In order to restrain the vehicle occupant, tensile force is applied to the webbing, namely, first applied to the first region in the webbing folded portion. When the tensile force reaches the first tensile force, the stitching of the first region comes undone and the length of the webbing is increased by an amount by which the folded portion corresponding to the first region is removed due to the undoing of the stitching of the first region.

Next, the tensile force is applied to the second region. The folded portion corresponding to the second region is removed without applying active tensile force thereto, namely, with a small tensile force or substantially without any tensile force, and the length of the webbing is increased by an amount by which the folded portion corresponding to the second region is removed. At this time, the movement of the vehicle occupant in the forward direction of the vehicle is mainly suppressed by the air bag apparatus.

Subsequently, the tensile force is applied to the third region. The stitching of the third region comes undone due to the second tensile force which is smaller than the first tensile force and the length of the webbing is increased by an amount by which the folded portion corresponding to the third region is removed due to the undoing of the stitching of the third region. The tensile force which has been made smaller or has been removed in the second region increases in stages until it reaches the fold tip end in the third region.

In this way, since all of the folded portion of the webbing from the fold base end to the fold tip end is removed and the length of the webbing is increased, the kinetic energy of the vehicle occupant is moderately absorbed and gradual restraining of the vehicle occupant can be realized.

DESCRIPTION OF THE PREFERRED EMBODIMENTS

A description will now be given of a vehicle occupant-restraining webbing according to an embodiment of the present invention with reference to FIGS. 1 through 3. Note that arrows "FR", "W" and "UP" shown in the accompanying drawings, respectively represent: the forward direction of a vehicle; a transverse direction of the vehicle; and the upward direction thereof.

Figure 1:
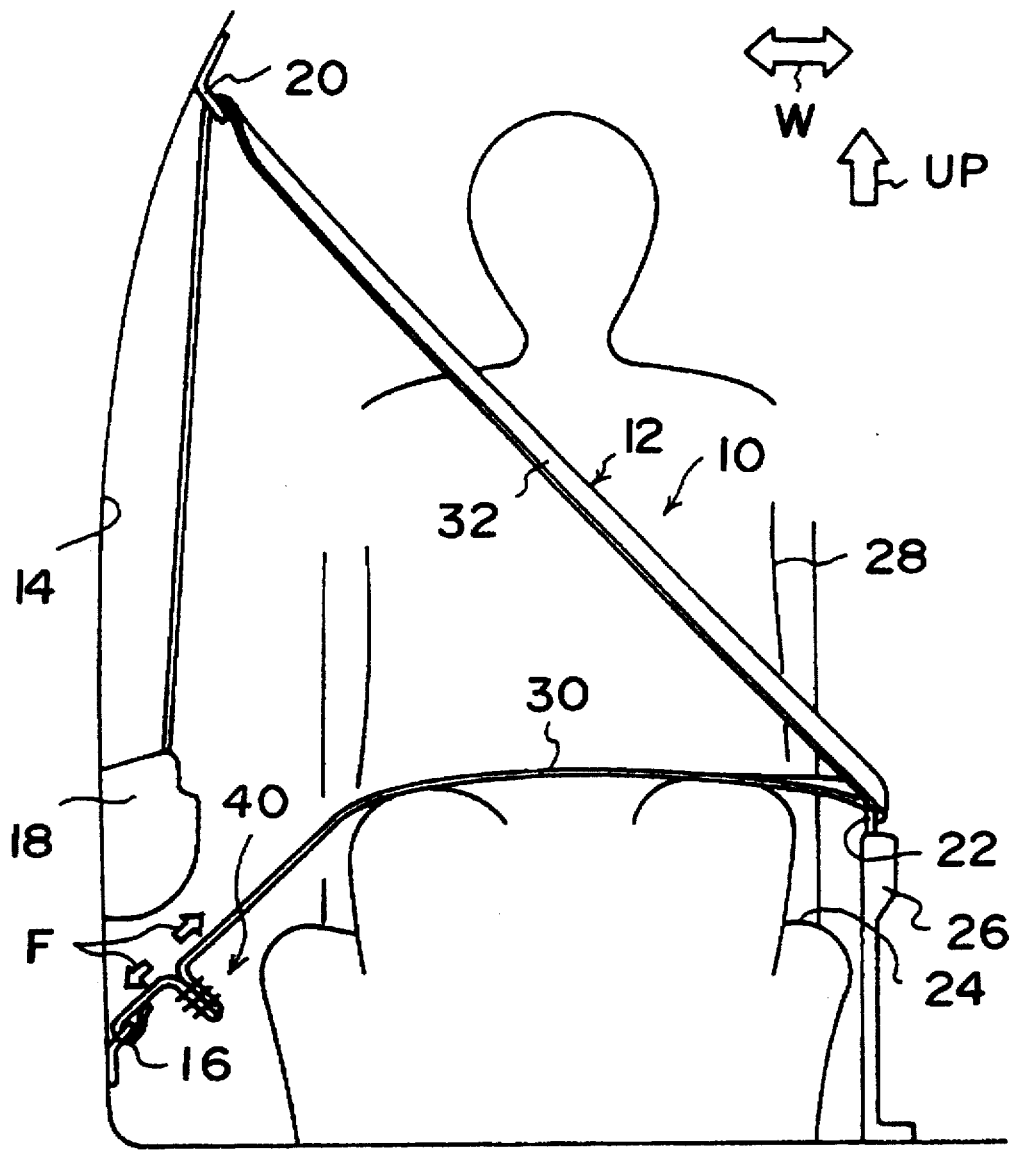
FIG. 1 is a diagram showing a three-point seat belt apparatus to which a vehicle occupant-restraining webbing according to an embodiment of the present invention is applied when seen from a front side of a vehicle.

As shown in FIG. 1, in a three-point seat belt apparatus 10 for a vehicle driver's seat, one end of a vehicle occupant-restraining webbing (which will be hereinafter referred to as "webbing") 12 is retained at a lap anchor 16 provided in a lower portion of a vehicle side wall 14 and another end of the webbing 12 is retracted by a webbing winding apparatus (which will be hereinafter referred to as "winding apparatus") 18 provided in the lower portion of the vehicle side wall 14. A longitudinally intermediate portion of the webbing 12 is inserted through and supported by a shoulder anchor 20 provided in an upper portion of the vehicle side wall 14 and a tongue plate 22 is fitted to a portion of the webbing 12 between the lap anchor 16 and the shoulder anchor 20 so as to be slidable in the longitudinal direction of the webbing.

A buckle 26 is formed uprightly at a side of a vehicle seat 24 at a position near a transversely central portion of the vehicle. When the tongue plate 22 is engaged with the buckle 26, the webbing 12 is applied to the vehicle occupant. At this time, a portion of the webbing 12 between the lap anchor 16 and the tongue plate 22 is a lap webbing portion 30 which abuts against a lap region of a vehicle occupant 28, and a portion of the webbing 12 between the tongue plate 22 and the shoulder anchor 20 is a shoulder webbing portion 32 which abuts against the body of the vehicle occupant 28 from the chest to the shoulder.

The winding apparatus 18 is provided such that, in a normal state, the webbing 12 can be pulled out thereof. However, at the time of a sudden deceleration of the vehicle, the winding apparatus 18 is adapted to prevent the webbing 12 from being pulled out thereof. When the webbing 12 is prevented from being pulled out of the winding apparatus 18, the inertial movement of the vehicle occupant 28 in the forward direction of the vehicle is restricted, so that the vehicle occupant is restrained and protected.

On the other hand, an air bag apparatus is provided to serve as an auxiliary occupant protecting apparatus.

Figure 2:
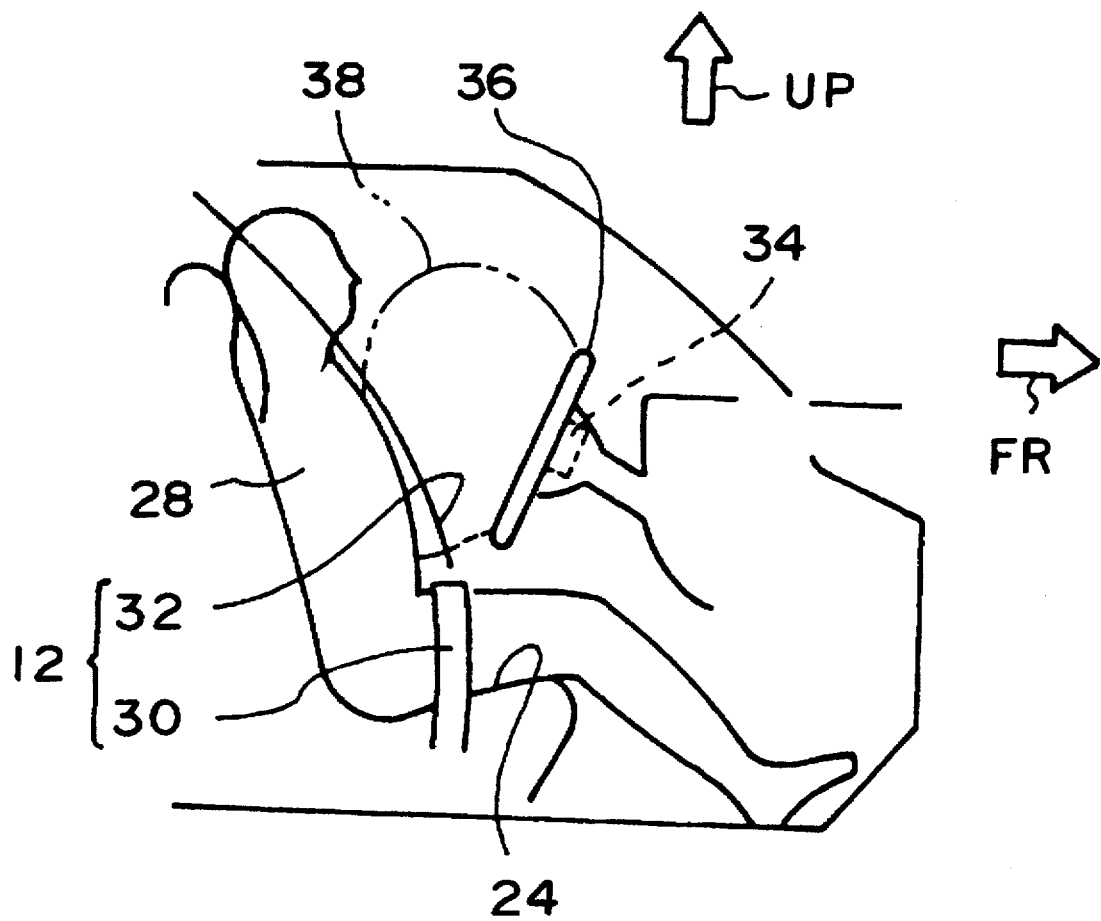
FIG. 2 is a diagram of an air bag apparatus when seen from a transverse direction of the vehicle.

As shown in FIG. 2, an air bag apparatus 34 for a vehicle driver's seat is provided on a steering wheel 36. In the air bag apparatus 34, although not illustrated, when an acceleration sensor detects the state of a sudden deceleration of the vehicle, an inflator is actuated and high pressure gas is generated. The generated gas is supplied into a bag body which is usually folded. The bag body 38 is accordingly inflated toward the vehicle occupant 28 as indicated by two-dot chain line in FIG. 2 to restrain the vehicle occupant 28.

Meanwhile, a portion of the webbing 12 in the vicinity of the lap anchor 16 is folded over along the transverse direction of the webbing 12 and is sewn together so as to form a substantially U-shaped webbing length increasing section 40 (see FIG. 1).

Figure 3A:
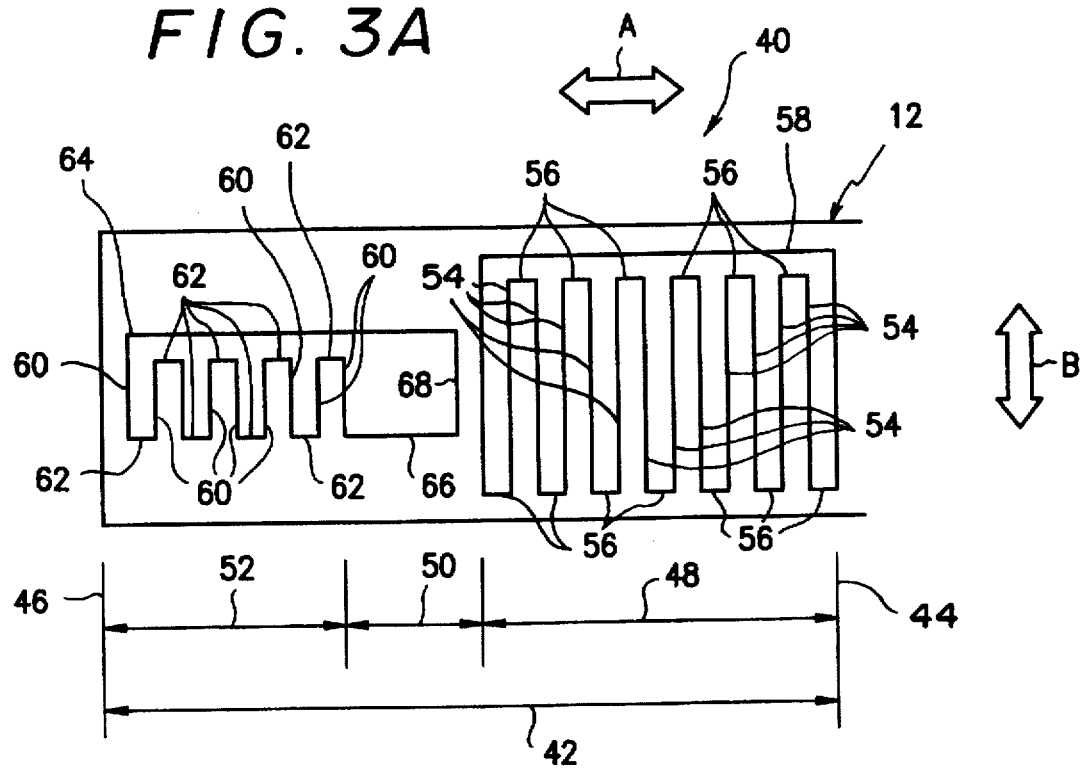
FIG. 3A is a schematic view showing seam lines of the webbing when seen from obverse and reverse sides of the webbing.
Figure 3B:
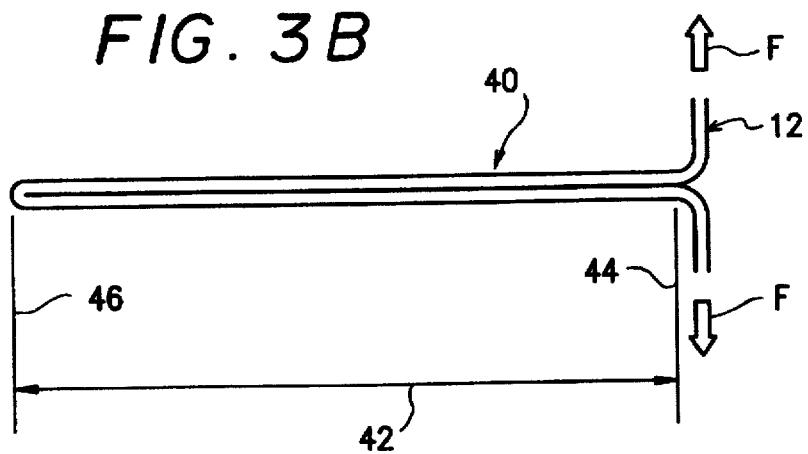
FIG. 3B is a schematic view of the webbing when seen from a transverse direction of the webbing.

As shown in FIG. 3, in the webbing length increasing section 40, a folded portion 42 includes a first region 48, a second region 50 and a third region 52, which are sequentially arranged in order from a fold base end 44 side to a fold tip end 46 side.

In the first region 48 in the vicinity of the fold base end 44, a plurality of rows of stitches (stitch rows) 54 (in FIG. 3, each stitch row is formed as a straight line and other stitch rows are each formed in a similar manner) of which longitudinal directions coincide with the transverse direction of the webbing (i.e., the direction indicated by arrow B) and which generally extend over the transverse direction dimension of the webbing are formed in the longitudinal direction of the webbing. Adjacent stitch rows 54 are connected by a short connecting stitch row 56 of which longitudinal direction coincides with the longitudinal direction of the webbing (i.e., the direction indicated by arrow A). The stitch row 54 positioned nearest to the fold base end 44 and the stitch row 54 positioned nearest to the second region 50, these stitch rows 54 being located farthest from each other, are connected by a long connecting stitch row 58 extending in the longitudinal direction of the webbing. In this way, the first region 48 has a sewn pattern in which all of the stitch rows thereof are formed to be a single continuous seam line.

The third region 52 at the side of the fold tip end 46 and the second region 50 disposed between the third region 52 and the first region 48 include a sewn-together portion similarly to the first region 48. In the third region 52, a plurality of stitch rows 60 of which longitudinal directions coincide with the transverse direction of the webbing are each shorter than the stitch rows 54 of the first region 48 and are positioned substantially at the center of the webbing in the transverse direction thereof. Further, the number of the stitch rows 60 are set smaller than that of the stitch rows 54 of the first region 48. Accordingly, the overall length of the stitch rows 60 becomes shorter than that of the stitch rows 54 of the first region 48. Adjacent stitch rows 60 are connected by a short stitch row 62 which extends in the longitudinal direction of the webbing. The stitch row 60 positioned nearest to the fold tip end 46 and the stitch row 60 positioned nearest to the second region 50, these stitch rows 60 being positioned farthest from each other, are connected by a long connecting stitch row 64, a short connecting stitch row 66 and a stitch row 68 in such a manner that the long connecting stitch row 64 formed along the longitudinal direction of the webbing extends from an end of the stitch row 60 positioned nearest to the fold tip end 46 into the second region 50, the short connecting stitch row 66 formed along the longitudinal direction of the webbing extends from an end of the stitch row 60 positioned nearest to the second region 50 into the second region 50, and the stitch row 68 extends along the transverse direction of the webbing to connect respective extended ends of the stitch rows 64, 66 to each other. As a result, the third region 52 and the second region 50 have a a sewn pattern in which all of the stitch rows therein are formed to be a single continuous seam line.

When the webbing 12 is pulled in the longitudinal direction thereof, namely, tensile force F (see FIG. 3B) is applied to the webbing 12 to remove the folded portion 42 to entirely make the webbing 12 linear, the break-resistant load of the sewing thread mainly acts as the sewing strength on the stitch rows 54, 60, 68 extending along the transverse direction of the webbing. Even if the sewing thread of the continuous stitch rows 56, 58, 62, 64, 66 does not break, the stitching comes undone due to the fraying of the sewing thread. For this reason, as compared with a case in which the break-resistant load of the sewing thread is the sewing strength, a sewing strength which is smaller than that acting on the stitch rows 54, 60, 68 is applied to the continuous stitch rows 56, 58, 62, 64, 66.

The sewing pattern of the first region 48 has the long stitch rows 54 and a large number of rows of stitches, and the sewing strength is accordingly large. The sewing pattern of the third region 52 has the short stitch rows 60 and a small number of rows of stitches as compared to those of the first region 48, and the sewing strength is small. Further, in the second region 50, only the short connecting stitch row 66, a portion of the long connecting stitch row 64 and the seam line 68 are formed, so that the sewing strength is extremely small.

Accordingly, a first tensile force needs to be actively applied to the first region 48 in order to undo the stitching of the stitch rows in the first region 48, and a second tensile force which is smaller than the first tensile force needs to be actively applied to the third region 52 in order to undo the stitching of the stitch rows in the third region 52. Further, the stitching of the stitch rows in the second region 50 can come undone even if a tensile force such as the first tensile force or the second tensile force is not actively applied to the second region 50.

While the stitching of the stitch rows is coming undone, the folded portion of the webbing is gradually decreased and the length of the webbing increases.

According to the above-described structure, at the time of a sudden deceleration of the vehicle, the seat belt apparatus 10 is actuated to cause the webbing 12 to restrain the vehicle occupant 28. Further, at the time of a sudden deceleration of the vehicle, the air bag apparatus 34 is actuated and the bag body 38 is accordingly inflated to restrain the vehicle occupant 28.

In order to restrain the vehicle occupant, the tensile force F is applied to the webbing 12, namely, first, applied to the first region 48 in the folded portion 42 of the webbing 12. When the tensile force reaches the first tensile force, the stitching of the stitch rows in the first region 48 comes undone (namely, the stitch rows 54, short continuous stitch rows 56 and long stitch row 58 come undone in order from the fold base end 44 side toward the fold tip end 46), and the length of the webbing increases by an amount by which the folded portion of the first region 48 is removed due to the undoing of the stitch rows of the first region 48.

Subsequently, the tensile force is applied to the second region 50. Since the second region SO is formed only by a portion of the long stitch row 64, the short connecting stitch row 66 and the stitch row 68, the folded portion of the second region 50 is removed without active tensile force applied thereto, namely, with a small tensile force or substantially without tensile force (in such a manner that the portion of the long stitch row 64, the short connecting stitch row 66 and the stitch row 68 come undone in order from the first region 48 side toward the fold tip end 46). As a result, the length of the webbing increases by an amount by which a folded portion of the second region 50 is removed due to the undoing of the stitching of the second region 50. At this time, the movement of the vehicle occupant in the forward direction of the vehicle is restrained mainly by the air bag apparatus 34.

Then, the tensile force is applied to the third region 52. The stitching of the third region 52 comes undone due to the second tensile force which is smaller than the first tensile force (in such a manner that the stitch rows 60, the short connecting stitch rows 62 and a portion of the long connecting stitch row 64 come undone in order from the second region 50 side toward the fold tip end 46) and the length of the webbing increases by an amount by which a folded portion of the third region 52 is removed due to the undoing of the stitching of the third region 52. The tensile force which has been made smaller or has been substantially removed in the second region 50 increases in stages until it reaches the fold tip end 46.

In this way, all of the folded portion 42 of the webbing from the fold base end 44 to the fold tip end 46 is removed (i.e., the webbing becomes linear) and the length of the webbing is increased. Consequently, the kinetic energy of the vehicle occupant 28 is moderately absorbed and gradual restraining of the vehicle occupant 28 can be realized.

It should be noted that the second region 50 has the stitching formed from a portion of the long connecting stitch row 64, the short connecting stitch row 66 and the stitch row 68, but it may not have any stitching to be formed therein.

In the foregoing, a description was given of the three-point seat belt apparatus and the air bag apparatus for the vehicle driver's seat. However, the present invention is not limited to those for the driver's seat and can be applied to those for other vehicle seats such as an assistant driver's seat or the like. Further, the seat belt apparatus of the present invention is not limited to the three-point seat belt apparatus.

Further, respective regions of the webbing folded portion are provided to have different sewing strengths due to the length and the number of the stitch rows. However, the present invention is not limited to the same. For example, the density of stitching may vary for each region, or the like. Further, the sewing pattern in the folded portion of the webbing is not limited to the above-described embodiment, and various sewing patterns can be applied.

Further, each ratio of area, in the longitudinal direction of the webbing, of the first, second and third regions in the webbing folded portion can be set arbitrarily.

Still further, in the above-described embodiment, the folded portion of the webbing is provided in the vicinity of the lap anchor 16. However, the present invention is not limited to the same, and the folded portion can be provided at any suitable arbitrary position of the webbing.

What is claimed is:

1. A vehicle occupant-restraining webbing which is used in a seat belt apparatus of a vehicle in which an air bag apparatus is provided as an auxiliary occupant protecting apparatus, comprising:

a webbing length increasing section in which a folded portion of the webbing, formed with a portion of the webbing being folded in a longitudinal direction of the webbing, includes first, second and third regions arranged in order from a fold base end to a fold tip end, wherein the first region is formed by stitching and when a first tensile force acts in the longitudinal direction of the webbing and is applied to the first region to undo the stitching of the first region, the length of the webbing is increased; the second region is formed by stitching and provided so as to increase the length of the webbing with the application of only a small tensile force in the longitudinal direction of the webbing when the stitching of the second region comes undone; and the third region is formed by stitching and when a second tensile force which is smaller than the first tensile force acts in the longitudinal direction of the webbing and is applied to the third region to undo the stitching of the third region, the length of the webbing is increased.

2. A vehicle occupant-restraining webbing according to claim 1, wherein the first region has a plurality of stitch rows of whose longitudinal directions substantially coincide with a transverse direction of the webbing and which rows are aligned in the longitudinal direction of the webbing.

3. A vehicle occupant-restraining webbing according to claim 2, wherein the first region has short connecting stitch rows which are each provided to connect respective ends of adjacent rows of the plurality of stitch rows to each other.

4. A vehicle occupant-restraining webbing according to claim 3, wherein the first region has a long connecting stitch row which connects an end of a stitch row of the plurality of stitch rows, positioned nearest to the fold base end, and an end of a stitch row of the plurality of stitch rows positioned nearest to the second region, to each other.

5. A vehicle occupant-restraining webbing according to claim 1, wherein a dimension of the second region in the longitudinal direction of the webbing is shorter than that of the first region.

6. A vehicle occupant-restraining webbing according to claim 5, wherein the second region has a stitch row of which a longitudinal direction substantially coincides with the transverse direction of the webbing and of which a length is shorter than that of each row of a plurality of stitch rows provided in the first region.

7. A vehicle occupant-restraining webbing according to claim 1, wherein a dimension of the third region in the longitudinal direction of the webbing is shorter than that of the first region.

8. A vehicle occupant-restraining webbing according to claim 7, wherein the third region has a plurality of stitch rows of whose longitudinal directions substantially coincide with a transverse direction of the webbing and which rows are aligned in the longitudinal direction of the webbing, the plurality of stitch rows being provided in that each transverse row length is shorter than the length of each transverse row of a plurality of stitch rows provided in the first region.

9. A vehicle occupant-restraining webbing according to claim 8, wherein the third region has short connecting stitch rows which are each provided to connect respective ends of adjacent rows of the plurality of stitch rows in the third region to each other.

10. A vehicle occupant-restraining webbing according to claim 8, further comprising:
a long connecting stitch row provided to connect an end of a stitch row of the plurality of stitch rows provided in the third region, positioned nearest to the fold tip end, and an end of a stitch row provided in the second region, to each other.

11. A vehicle occupant-restraining webbing according to claim 10, further comprising:
a short connecting stitch row provided to connect an end of a stitch row of the plurality of stitch rows provided in the third region, positioned nearest to the fold base end, and another end of the stitch row provided in the second region, to each other.

12. A vehicle occupant-restraining webbing which is used in a seat belt apparatus of a vehicle in which an air bag apparatus is provided as an auxiliary occupant protecting apparatus, comprising:
a webbing length increasing section in which a folded portion of the webbing, formed with a portion of the webbing being folded in a longitudinal direction of the webbing, includes first, around and third region arranged in order from a fold base end to a fold tip end,
wherein the first region is formed by stitching and when a first tensile force acts in the longitudinal direction of the webbing and is applied to the first region to undo the stitching of the first region, the length of the webbing is increased; the second region whose dimension in the longitudinal direction of the webbing is shorter than that of the first region is formed by stitching and is provided so as to increase the length of the webbing with the application of only a small tensile force in the longitudinal direction of the webbing when the stitching of the second region comes undone; and the third region whose dimension in the longitudinal direction of the webbing is shorter than that of the first region is formed by stitching and when a second tensile force which is smaller than the first tensile force acts in the longitudinal direction of the webbing and is applied to the third region to undo the stitching of the third region, the length of the webbing is increased.

13. A vehicle occupant-restraining webbing according to claim 12, wherein the first region has a plurality of stitch rows of whose longitudinal directions substantially coincide with a transverse direction of the webbing and which rows are aligned in the longitudinal direction of the webbing.

14. A vehicle occupant-restraining webbing according to claim 13, wherein the first region has short connecting stitch rows which are each provided to connect respective ends of adjacent rows of the plurality of stitch rows to each other.

15. A vehicle occupant-restraining webbing according to claim 14, wherein the first region has a long connecting stitch row which connects an end of a stitch row of the plurality of stitch rows, positioned nearest to the fold base end, and an end of a stitch row of the plurality of stitch rows positioned nearest to the second region, to each other.

16. A vehicle occupant-restraining webbing according to claim 12, wherein the second region has a stitch row of which a longitudinal direction substantially coincides with the transverse direction of the webbing and of which a length is shorter than that of each row of a plurality of stitch rows provided in the first region.

17. A vehicle occupant-restraining webbing according to claim 12, wherein the third region has a plurality of stitch rows of whose longitudinal directions substantially coincide with a transverse direction of the webbing and which rows are aligned in the longitudinal direction of the webbing, the plurality of stitch rows being provided in that each transverse row length is shorter than the length of each transverse row of a plurality of stitch rows provided in the first region.

18. A vehicle occupant-restraining webbing according to claim 17, wherein the third region has short connecting stitch rows which are each provided to connect respective ends of adjacent rows of the plurality of stitch rows in the third region to each other.

19. A vehicle occupant-restraining webbing according to claim 17, further comprising:
a long connecting stitch row provided to connect an end of a stitch row of the plurality of stitch rows provided in the third region, positioned nearest to the fold tip end, and an end of a stitch row provided in the second region, to each other.

20. A vehicle occupant-restraining webbing according to claim 19, further comprising:
a short connecting stitch row provided to connect an end of a stitch row of the plurality of stitch rows provided in the third region, positioned nearest to the fold base end, and another end of the stitch row provided in the second region, to each other.

21. A vehicle occupant-restraining webbing which is used in a seat belt apparatus of a vehicle in which an air bag apparatus is provided as an auxiliary occupant protecting apparatus, comprising:
a webbing length increasing section in which a folded portion of the webbing, formed with a portion of the webbing being folded in a longitudinal direction of the webbing, includes first, second and third regions arranged in order from a fold base end to a fold tip end,
wherein the first region is formed by stitching and when a first tensile force acts in the longitudinal direction of the webbing and is applied to the first region to undo the stitching of the first region, the length of the webbing is increased; the second region is provided without stitching so as to increase the length of the webbing without applying active tensile force in the longitudinal direction of the webbing; and the third region is formed by stitching and when a second tensile force which is smaller than the first tensile force acts in the longitudinal direction of the webbing and is applied to the third region to undo the stitching of the third region, the length of the webbing is increased.

* * * * *